(12) United States Patent
Hu et al.

(10) Patent No.: US 11,054,136 B2
(45) Date of Patent: Jul. 6, 2021

(54) INTERFACE FOR DOUBLE-SKIN COMBUSTOR LINER

(71) Applicant: PRATT & WHITNEY CANADA CORP., Longueuil (CA)

(72) Inventors: Tin-Cheung John Hu, Markham (CA); Robert Sze, Mississauga (CA)

(73) Assignee: PRATT & WHITNEY CANADA CORP., Longueull (CA)

( * ) Notice: Subject to any disclaimer, the term of this patent is extended or adjusted under 35 U.S.C. 154(b) by 217 days.

(21) Appl. No.: 16/205,933

(22) Filed: Nov. 30, 2018

(65) Prior Publication Data

US 2020/0173661 A1 Jun. 4, 2020

(51) Int. Cl.
*F23R 3/00* (2006.01)
*F23R 3/46* (2006.01)
*F23R 3/06* (2006.01)

(52) U.S. Cl.
CPC ........ *F23R 3/002* (2013.01); *F05D 2230/642* (2013.01); *F05D 2260/30* (2013.01); *F05D 2300/6033* (2013.01); *F23R 3/007* (2013.01); *F23R 3/06* (2013.01); *F23R 3/46* (2013.01)

(58) Field of Classification Search
CPC .......... F23R 3/002; F23R 3/007; F23R 3/045; F23R 3/06; F23R 3/60; F23R 2900/00005; F23R 2900/00012; F23R 2900/00017; F05D 2260/30; F05D 2260/38; F05D 2260/36; F05D 2260/39; F05D 2230/642; F05D 2230/644; F01D 25/26
See application file for complete search history.

(56) References Cited

U.S. PATENT DOCUMENTS

| | | | |
|---|---|---|---|
| 6,668,559 B2 | 12/2003 | Calvez et al. | |
| 7,849,696 B2 * | 12/2010 | De Sousa | F23R 3/007 60/804 |
| 9,328,665 B2 * | 5/2016 | Doerr | F23R 3/007 |
| 9,423,130 B2 * | 8/2016 | Prociw | F02C 3/145 |
| 2012/0204727 A1 * | 8/2012 | Nordlund | F23R 3/002 96/221 |
| 2015/0132117 A1 * | 5/2015 | Marra | F23R 3/46 415/187 |

* cited by examiner

*Primary Examiner* — Gerald L Sung
*Assistant Examiner* — Stephanie Sebasco Cheng
(74) *Attorney, Agent, or Firm* — Norton Rose Fulbright Canada LLP

(57) ABSTRACT

An interface for double-skin combustor liner comprises an annular ceramic matrix composite (CMC) body. The annular body extends from a first side to a second side, the first and second sides each having an annular inner joint groove configured to receive a CMC combustor skin and an annular outer joint groove configured to receive a metal combustor skin. The outer joint groove is radially outward of the inner joint groove. A combustor and an gas turbine engine with the interface are also provided.

17 Claims, 4 Drawing Sheets

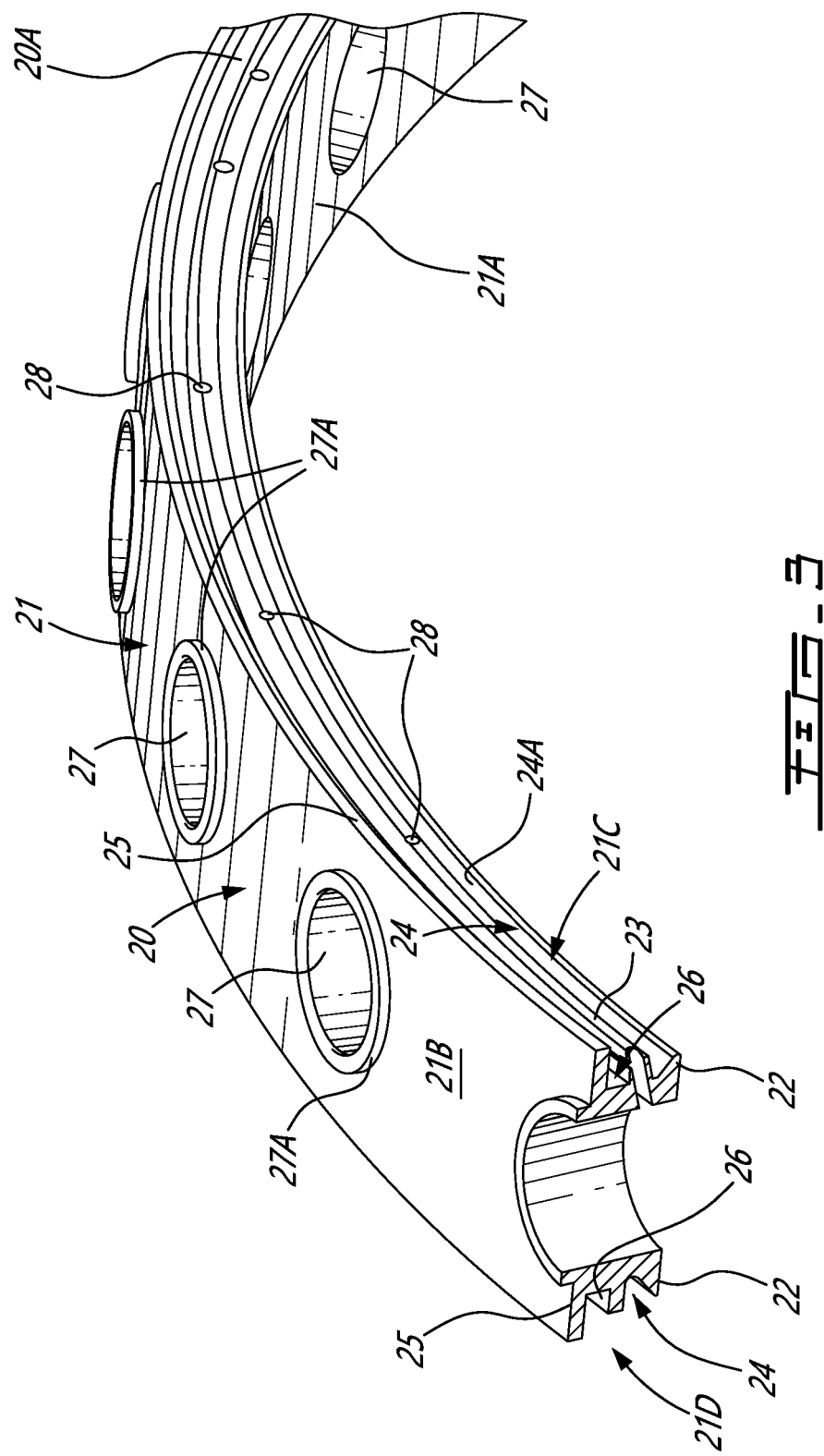

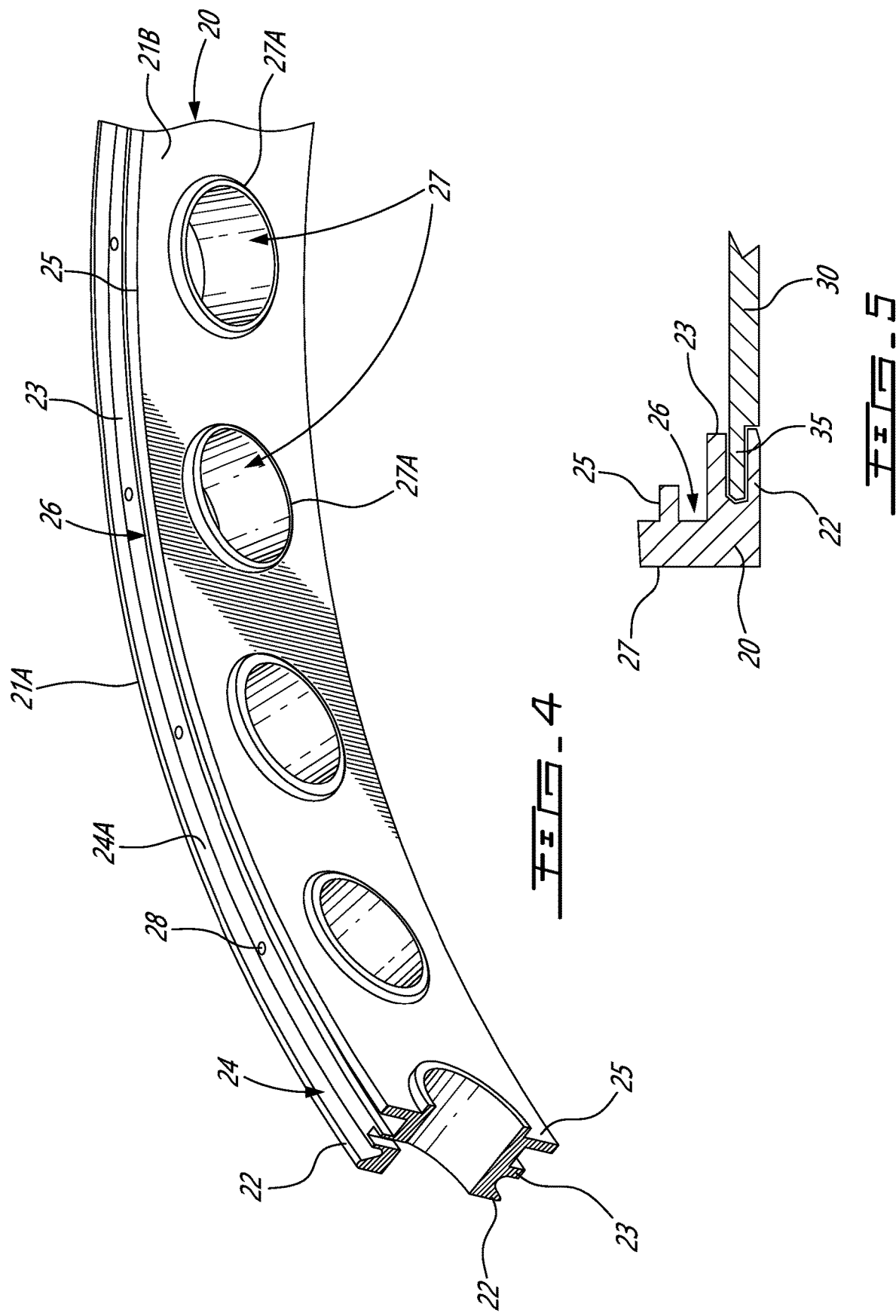

INTERFACE FOR DOUBLE-SKIN COMBUSTOR LINER

TECHNICAL FIELD

The application relates gas turbine engines and more particularly to combustor liners with ceramic matrix composite panels.

BACKGROUND

Ceramic matrix composite (CMC) parts are used in a combustor for their capacity to sustain the high temperatures of combustion. The CMC parts may be part of a liner, with metal and CMC components. One challenge is the different thermal growth rates of the two materials.

SUMMARY

In one aspect, there is provided an interface for double-skin combustor liner, the interface comprising an annular ceramic matrix composite (CMC) body, the annular body extending from a first side to a second side, the first and second sides each having an annular inner joint groove configured to receive a CMC combustor skin and an annular outer joint groove configured to receive a metal combustor skin, the outer joint groove radially outward of the inner joint groove.

In another aspect, there is provided a combustor for a gas turbine engine comprising: a combustor chamber having dome and duct portions, the dome and duct portions each having an inner ceramic matrix composite (CMC) skin and an outer skin radially spaced from the inner CMC skin, the inner CMC skin defining an inner surface of the combustor chamber; an annular CMC interface disposed between the dome and body portions, the interface extending from a first side to a second side and having an inner circumferential face providing a portion of the inner surface of the combustion chamber, the first and second sides having an inner joint groove receiving the inner CMC skins of the dome and duct portions to form a continuous CMC surface with the inner circumferential face and an outer joint groove receiving the outer skins of the dome and body portions, the outer joint groove radially outward of the inner joint groove.

In another aspect, there is provided a gas turbine engine comprising: a combustor defined by a combustor chamber having dome and duct portions, the dome and duct portions each having an inner ceramic matrix composite (CMC) skin and an outer skin radially spaced from the inner CMC skin, the inner CMC skin defining an inner surface of the combustor chamber; and an annular CMC interface disposed between the dome and body portions, the interface extending from a first side to a second side and having an inner circumferential face providing a portion of the inner surface of the combustion chamber, the first and second sides having an inner joint groove receiving the inner CMC skins of the dome and duct portions to form a continuous CMC surface with the inner circumferential face and an outer joint groove receiving the outer skins of the dome and body portions, the outer joint groove radially outward of the inner joint groove.

In another aspect, there is provided an interface for double-skin combustor liner, the interface comprising an annular body made of ceramic matrix composite (CMC), the annular body having a first axial side, a second axial side, and an inner circumferential face between the first axial side and the second axial side, the inner circumferential face adapted to define an inner surface portion of a combustor, an inner joint portion in the first axial side and/or in the second axial side adapted to be interfaced with at least one CMC inner skin to form a continuous CMC surface with the inner circumferential face, and an outer joint portion in the first axial side and/or in the second axial side adapted to be interfaced with at least one metal shell outer skin.

DESCRIPTION OF THE DRAWINGS

Reference is now made to the accompanying figures in which:

FIG. 3 is a first perspective view of the interface of FIG. 2;

FIG. 4 is a second perspective view of the interface of FIG. 2; and

FIG. 5 is a schematic view of a joint configuration between the interface of FIG. 2 and skins, in accordance with another embodiment of the present disclosure.

DETAILED DESCRIPTION

Figure 1:
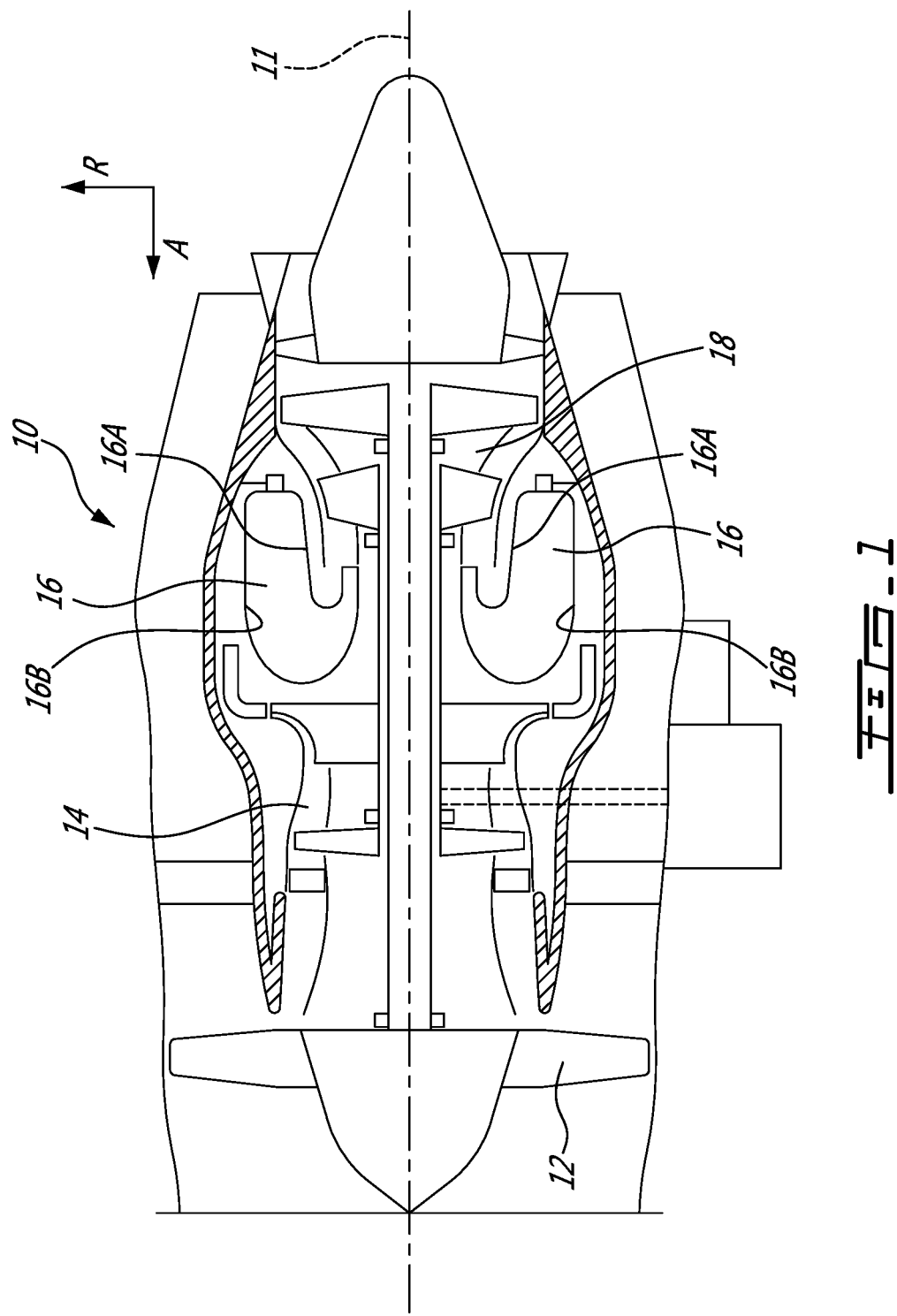
FIG. 1 is a schematic cross-sectional view of a gas turbine engine with a double-skin combustor in accordance with the present disclosure.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Though the combustor 16 is illustrated as a reverse-flow type combustor, other combustor configurations are contemplated, such as annular straight-through and can-type combustors. Components of the engine 10 are rotatable about a longitudinal center axis 11 of the engine 10.

The combustor 16 may have a double-skin construction as detailed hereinafter. The combustor 16 is annular in shape, around center axis 11. This explains the mirror images of the combustor 16 in FIG. 1, relative to the center axis 11. The combustor 16 may have an annular combustor chamber defined between an inner liner 16A and an outer liner 16B. Either one or both of the inner liner 16A and outer liner 16B may have double-skin constructions on part or all of the combustor 16.

Figure 2:
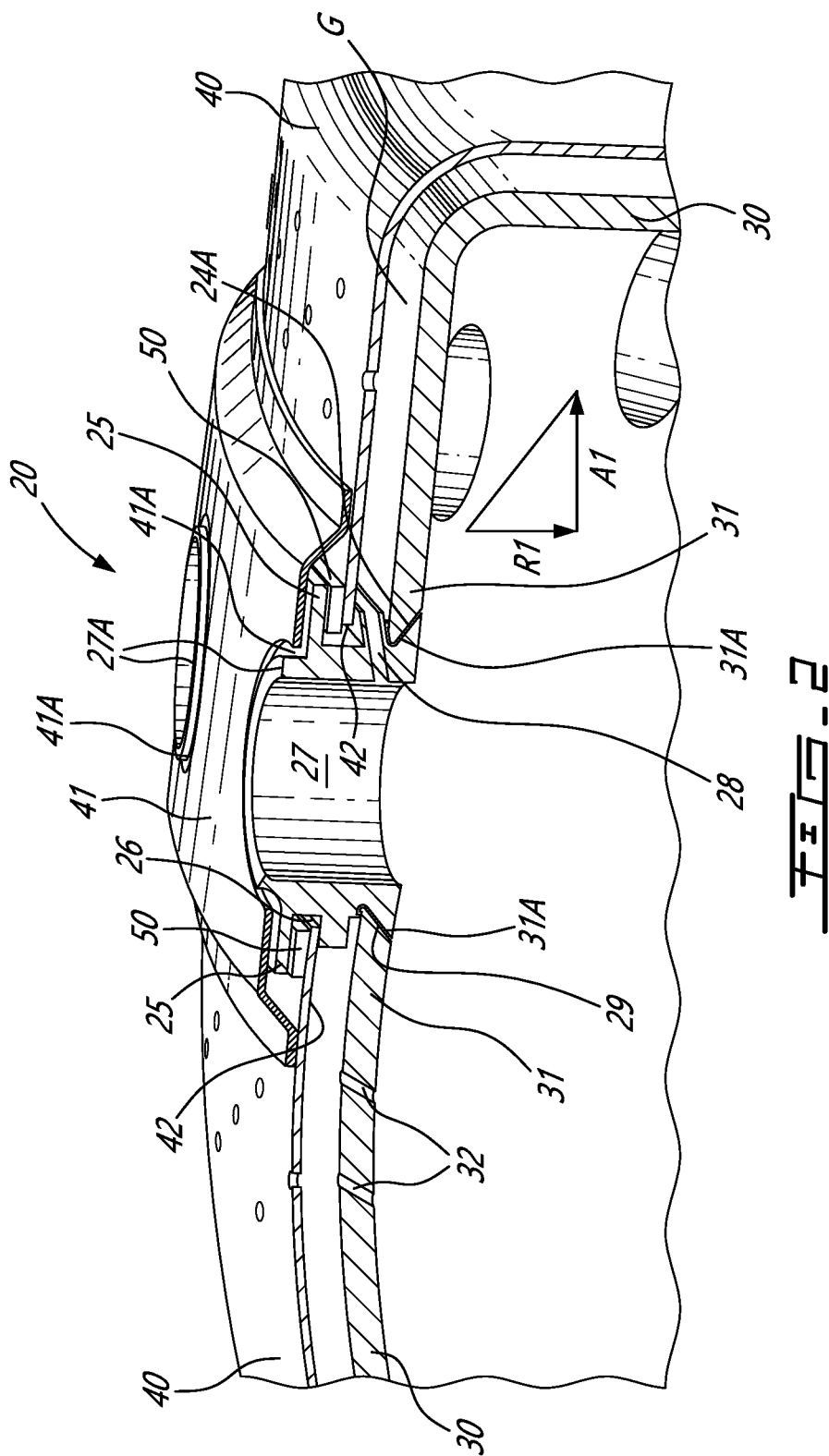
FIG. 2 is a sectional view of an interface for a skins of the double-skin combustor of FIG. 1.

Referring to FIG. 2, an interface ring assembly for holding a double-skin combustor liner is generally shown at 20. The interface 20 may be used in the gas turbine engine 10 of FIG. 1, with one or both of the inner liner 16A and outer liner 16B. The interface 20 may be tasked with holding the skins 30 and 40 spaced apart from one another for back-side impingement and front-side effusion cooling, while allowing the thermal expansion of the skins 30 and 40 relative to one another.

The interface 20 has an annular body 21. The annular body 21 may also be referred to as a ring, annulus, ring assembly, etc. The annular body 21 is made of ceramic matrix composite (CMC). In an embodiment, the annular body 21 is a monoblock CMC component. In another embodiment, the annular body 21 is constituted of arcuate segments concurrently forming the annular body 21. Consequently, the annular body 21 may be a ring assembly, or may be said to be tiled. Joints 20A (FIG. 3) between arcuate segments may be any form of overlapping joint, such as tongue and groove, etc. Other arrangements are contemplated to interconnect arcuate segments to form the annular body 21.

The annular body 21 may lie in a plane to which the center axis 11 is normal and/or may be generally concentrically positioned relative to the center axis 11 (an occasional offset being possible, for example because of thermal expansion/contraction). Other orientations are contemplated as well. Therefore, relative to the center axis 11, the annular body 21 may have an inner circumferential face 21A, and an outer circumferential face 21B. The inner circumferential face 21A and the outer circumferential face 21B may be separated by a first axial side 21C and a second axial side 21D. The inner circumferential face 21A defines the surface of the interface 20 that is in the combustor chamber. The axial sides 21C and 21D define the inner joint portions and outer joint portions holding the inner skins 30 and the outer skins 40 spaced apart from each other.

In order to form the inner joint portions and/or the outer joint portions, either one or both of the axial sides 21C and 21D have surface features for connection with the skins 30 and/or 40. According to an embodiment, the axial sides 21C and/or 21D may have a first projecting portion 22, a second projecting portion 23 with an inner joint groove 24 between them, the projecting portions 22,23 and groove 24 all being annular. The inner groove 24 may define a sliding surface 24A, for sliding contact with the inner skin 30, as detailed hereinafter. The sliding surface 24A may extend both radially and axially. This may be illustrated relative to the coordinate system A,R shown in FIG. 1, with A representative of an axial direction that is parallel to the center axis 11, and with R representative of a radial direction that is radial to the center axis 11. The inner projecting portion 22 may extend in a direction shown as having an axial component A1 and a radial component R1.

According to an embodiment, the axial sides 21C and/or 21D may further have a third projecting portion 25 with an outer joint groove 26 between the second projecting portion 23 and the third projecting portion 25, the projecting portion 25 and groove 26 being annular. The first projecting portion 22, the second projecting portion 23 and the third projecting portion 25 may be integrally part of the annular body 21, i.e., they may result from the fabrication of the annular body 21. The grooves 24 and 26 may be said to be annular, as they extend along the annular body 21.

The annular body 21 may have a plurality of holes 27 circumferentially distributed along the annular body 21. According to an embodiment, the central axes of the holes 27 are aligned with the radial direction R. Other orientations are possible for the holes 27. The holes 27 may be quench holes or dilution jet holes, by which dilution air for example may enter the combustor 16. Accordingly, the holes 27 may have a diameter ranging between 0.05" and 2". Necks 27A may be present, and may define an opening of the holes 27 in the outer circumferential face 21B. Stated differently, the necks 27A may projected radially from a remainder of the outer circumferential face 21B, and may serve as abutments for the metal shell as explained hereinafter.

The interface 20 may or may not have entrainment flow passages 28, extending from the second projecting portion 23 to the holes 27. In an embodiment, there is one entrainment flow passage 28 for every hole 27. There could also be multiple entrainment flow passages 28 distributed circumferentially around the dilution/jet hole 27. The entrainment flow passages 28 define fluid passages from an annular space G between the skins 30 and 40, to the dilution passage of the holes 27. Therefore, a flow of dilution air into the combustor 16 may entrain air from the annular space G, notably due to the converging orientation of the entrainment flow passages 28 relative to the holes 27.

The interface 20 may or may not have flow channels 29 defined in the inner groove 24. The flow channels 29 may be concavities relative to the adjacent surfaces of the first projecting portion 22 and inner groove 24. The flow channels 29 define fluid passages from the annular space G between the skins 30 and 40, to the combustion chamber. Flow channels 29 may be discretely circumferentially distributed along the interface 31A. The film that may result from the holes 29 may serves as the starter film for the effusion cooling on the hot face of 30 if necessary.

The interface 20 is configured to hold the inner skin 30 and the outer skin 40 spaced apart from one another, such that the annular space G is defined between the skins 30 and 40. The skins 30 and 40 may be part of the inner liner 16A or of the outer liner 16B. The inner skins 30 are the ones that delimit an interior of the combustor 16. The inner skins 30 may be known as being or forming the hot-side panel and are thus exposed to the combustion gases and temperatures. The inner skins 30 are made of a ceramic matrix composite (CMC). The CMC used is one in which fibers (e.g., ceramic fibers, silicon carbide, alumina, carbon, carbon fibers, etc) are embedded in a ceramic matrix. For example, the inner skins 30 may be made of tiles of CMC panels. As another possibility, the inner skins 30 are made of a single annular body of CMC, i.e. over 360 degrees. The interface 20 may be used with both configurations of the inner skin 30. In FIG. 2, one of skins 30 is shown as being part of a dome of the combustor 16 (i.e., to the right-hand side), whereas the left-hand side skin 30 may be part of a duct portion of the combustor 16.

Referring to FIG. 2, the end edges 31 of the inner skins 30 may be circular and may be generally concentric relative to the center axis 11 when installed in the engine 10. The end edges 31 of the inner skins 30 are shown as having a sliding surface 31A. Cooling holes 32 may or may not be also be present in the inner skins 30, for air to penetrate the combustor chamber. The end edges 31 of the inner skins 30 are received in the inner grooves 24, in such a way that a generally continuous CMC annular surface is defined concurrently by the inner circumferential face 21A, and the surfaces of the inner skins 30. When received in the inner grooves 24, the sliding surface 31A of the inner skins 30 may be in sliding contact with the sliding surface 24A of the inner groove 24, such that the sliding surfaces 24A and 31A concurrently form an expansion joint, by which the inner skins 30 may move relative to the interface 20, axially and/or radially. In an embodiment, the CMC to CMC contact between the sliding surfaces 24A and 31A forms a sealing arrangement. In another embodiment, the slanted sliding surfaces may not be present. For example, as shown in FIG. 5, a tongue-and-groove arrangement may be present, with the CMC inner skin 30 having a tongue 35 projecting axially from its main body, to be received in the inner groove 24, and to form the continuous CMC surface inside the combustion chamber.

The outer skins 40 define an exterior of the combustor 16. The outer skins 40 may be known as the shell or metal shell of the combustor 16. The outer skins 40 form the structure of the combustor 16, in that they support the inner skins 30. The outer skins 40 are made of metal, such as interconnected metallic segments or single annular metallic bodies. Although not shown, connectors, beams, or like structural components may be provided on the outer skin 40 for its connection to a structure of the gas turbine engine 10. For example, an annular cap 41 may interconnected adjacent outer skins 40 in the manner shown in FIG. 2. The annular cap 41 may project radially from the adjacent outer surfaces of the outer skins 30, so as to define a volume to receive the interface 20, although this radial projection is optional. The annular cap 41 is for example made of metal (e.g., sheet metal). The annular cap 41 may be welded, brazed and/or secured with mechanical fasteners to the outer skins 40. The annular cap 41 may define bores 41A that are sized and circumferentially spaced apart in such a way to emulate the distribution of the holes 27 in the interface 20. According to an embodiment, the necks 27A are matingly received in the bores 41A.

Still referring to FIG. 2, the end edges 42 of the outer skins 40 may therefore be received in the outer grooves 26 formed between the second projecting portion 23 and the third projecting portion 25. Because of the penetration of the third projecting portions 25 of the interface 20 in annular slots defined concurrently by the outer skins 40 and the annular cap 41 when assembled in the manner shown in FIG. 2, the interface 40 is held captive between the annular cap 41 and the outer skins 40. Springs 50 may or may not be present, to bias the interface 20 against the annular cap 41, and to enhance the integrity of the connection between the components.

In the arrangement of the interface 20, skins 30 and 40, and annular cap 41, the metallic components are substantially isolated from the combustion gases. As assembled, the interface 20 holds the inner skins 30 and the outer skins 40 spaced apart from one another with the annular space G between them. The inner skins 30 being of CMC, and the outer skins 40 being of metal, the thermal expansion may differ between the inner skins 30 and the outer skins 40 during combustion. This thermal expansion differential may have an axial component and/or a radial component to it. Stated differently, the inner skins 30 may expand in the axial direction differently than the outer skins 40 and/or the inner skins 30 may expand in the radial direction differently than the outer skins 40. Accordingly, the presence of the expansion joint formed by the interface 20 supporting the skins 30 and 40, allows such expansion differential while not substantially stressing the skins 30 and 40. As sliding surfaces 24A and 31A are oriented in the axial direction A and the radial direction R, as per A1 and R1, the expansion joint may allow some floating axially and radially. Consequently, it may be said that the expansion joint is a radial expansion joint and an axial expansion joint.

The radial spacing between the inner groove 24 and the outer groove 26 is such that the annular space G is preserved. Though only partially shown, some cooling holes may be defined in one or both of the skins 30 and 40, for cooling purposes.

In an embodiment, the annular cap 41 is fixedly attached to the outer skins 40, such as with connectors, welding, etc, consequently forming the outer metallic shell, i.e., the outer skin, that provides the retention to hold the interface 20 and skins 30 in place. Backside impingement cooling flow may exit the double-skin structure through effusion holes on the CMC inner skin. Play is provided for radial and axial growth between the CMC panel(s) of the inner skins 30, the outer skins 40 and the interface 20. The embodiments shown herein illustrate the interface 20 with double skins on both axial sides 21C and 21D. In an embodiment, only one of the axials sides 21C and 21D supports double skins. For example, one of the axial sides may be connected only to the metallic structure. Such a metallic structure (e.g., a single wall metallic liner) may be received in the inner groove 24. The axial side in such a scenario would have only one groove, or other connection arrangement (e.g., a projecting wall) for connection with the single wall metallic liner.

In the embodiment of FIG. 2, the interface 20 and CMC inner skins 30 are used in the hot side of the combustor 16 for durable life, and are used side-by-side to minimize the thermal mismatch at interfaces of the inner surface of the combustor chamber. The interface 20 may or may not have holes 27, but when such holes 27 are present, the quench hole position is used as a separation location for the long combustor. Wth the presence of holes 27, the interface 20 may provide quench (dilution) jet flows. The interface 20, for instance when used in a TALON combustor, may form a row of quench jet holes separating the primary zone and the dilution zone. In such an arrangement, the holes 27 may be exposed to a substantial combustor pressure drop. Various sizes of the holes 27 can be incorporated circumferentially. In another embodiment, the necks 27A may be used as port or boss for other components, such as fuel nozzles and/or ignitors. It is also contemplated to add floating collars at the holes 27.

The interface 20 may consequently partition the length of the CMC panels, i.e., the inner skins 30, by splitting an otherwise major CMC combustor panel length, to relieve thermal stresses in the hot section of the combustor 16. Smaller tubular segments may be easier to make and may entail lower costs of manufacturing. The first projecting portion 22, the second projecting portion 23 and the third projecting portion 25, if all three are present, form joints featuring three recessed steps: i) an inner step grabs onto the edges of the CMC inner skins 30; ii) a middle step upon which sits the outer metal shell, with springs 50 such as coils of flat springs attached to the outer skins 40 for damping and to provide biasing force for sealing the interfaces; and iii) the annular cap 41 may cover the interface 20 while attaching the adjacent outer shells together. The annular cap 41 retains the interface 20 and may also seal around the circumference of every hole 27, with mating engagement with the necks 27A. The interface 20 may also help maintain the gaps for backside impingement cooling, i.e., via the annular space G, for the backside impingement flow to be effective and perform convective cooling over the inner skins 30. The interface 20 may act as a spacer to create a gap between the skins 30 and 40. The entrainment flow passages 28 may also contribute to the backside impingement cooling, by allowing air to exit the impingement chamber (annular space G) The lower pressure generated by the high velocity quench jets may entrain a backside impingement flow out of the backside impingement chamber via the entrainment flow passages 28. Moreover, the flow channels 29 may also contribute to the efficiency of the combustor liner wall-cooling flow. The flow channels 29 may be viewed as small angled channels. Instead of a leakage flow at the end edge 31 of the inner skin(s) 30, a series of such flow channels 29 may create a cooling film downstream. Angled channel with L/D>1.5 can give orientation to the exiting flow, to cause a film to form over the hot-side of the downstream CMC inner skin 30.

The above description is meant to be exemplary only, and one skilled in the art will recognize that changes may be made to the embodiments described without departing from the scope of the invention disclosed. FIGS. 3 and 4 may show what forms the inner circumferential face 21A as being on a concave side of the annular body 21 (FIG. 3) or convex side of the annular body 21 (FIG. 4), based on whether the interface 20 is used for the outer liner (FIG. 3) or inner liner (FIG. 4). Still other modifications which fall within the scope of the present invention will be apparent to those skilled in the art, in light of a review of this disclosure, and such modifications are intended to fall within the appended claims.

The invention claimed is:

1. An interface for a double-skin combustor liner, the interface comprising an annular ceramic matrix composite (CMC) body formed about a center axis, the annular both extending from a first side on a first axial end of the annular body to a second side on a second axial end of the annular both spaced axially apart from the first axial end, the first and second sides each having an annular inner joint groove extending axially from each of the first and second axial ends into the annular body toward the other of the first and second axial ends, each annular inner joint groove configured to receive a respective CMC combustor skin, and the first and second sides each having an annular outer joint groove extending axially from each of the first and second axial ends into the annular body toward the other of the first and second axial ends, each annular outer joint groove configured to receive a respective metal combustor skin, each annular outer joint groove being radially outward of each annular inner joint groove.

2. The interface according to claim 1, wherein at least one of the annular inner joint grooves defines a respective sliding surface for the respective CMC combustor skin, the respective sliding surface oriented with a radial component and an axial component relative to the center axis of the annular CMC body.

3. The interface according to claim 1, wherein a plurality of holes extend from an outer circumferential face of the annular CMC body to an inner circumferential face of the annular CMC body, the holes being circumferentially distributed in the annular CMC body.

4. The interface according to claim 3, wherein the holes are quench jet holes.

5. The interface according to claim 3, further comprising fluid passages extending from one of the first side and the second side and distributed circumferentially.

6. The interface according to claim 3, further comprising necks projecting from the outer circumferential face around the holes.

7. The interface according to claim 1, wherein the annular CMC body is a CMC monoblock.

8. The interface according to claim 1, wherein the annular CMC body is CMC arcuate segments joined end to end to form the annular CMC body.

9. A combustor for a gas turbine engine comprising:
a combustor chamber having a dome portion and a duct portion, the dome and duct portions each having an inner ceramic matrix composite (CMC) skin and an outer skin radially spaced from the inner CMC skin, each inner CMC skin defining a part of an inner surface of the combustor chamber; and
an annular CMC interface formed about a center axis and disposed between the dome and duct portions, the interface extending from a first side at a first axial end of the annular CMC interface to a second side at a second axial end of the annular CMC interface and having an inner circumferential face providing a portion of the inner surface of the combustor chamber, the first and second sides each having an inner annular joint groove extending from each of the first and second axial ends into the annular CMC interface toward the other of the first and second axial ends, each inner joint groove receiving a respective one of the inner CMC skins of the dome and duct portions to form a continuous CMC surface with the inner circumferential face and an outer annular joint groove extending axially from each of the first and second axial ends into the annular CMC interface toward the other of the first and second axial ends, each outer joint groove receiving a respective one of the outer skin of the dome and duct portions, each outer joint groove being radially outward of each inner joint groove.

10. The combustor according to claim 9, wherein each of the dome and duct portions has a double-skin construction on opposite sides of the interface.

11. The combustor according to claim 10, wherein the outer skins of the dome and duct portions on opposite sides of the interface are connected by an annular cap covering the interface.

12. The combustor according to claim 10, comprising springs biasing the interface against the outer skins.

13. The combustor according to claim 9, wherein at least one of the inner joint grooves defines a respective sliding surface for the respective inner CMC skin, the respective sliding surface oriented with a radial component and an axial component relative to the center axis of the annular CMC interface.

14. The combustor according to claim 9, wherein a plurality of holes extend from an outer circumferential face of the annular CMC interface to the inner circumferential face of the annular CMC interface, the holes being circumferentially distributed in the annular CMC interface.

15. The combustor according to claim 14, further comprising fluid passages extending from one of the first side and the second side to the holes, the fluid passages being in fluid communication with an annular space.

16. The combustor according to claim 14, further comprising necks projecting from the outer circumferential face around the holes.

17. A gas turbine engine comprising:
a combustor defined by a combustor Chamber having a dome portion and a duct portion, the dome and duct portions each having an inner ceramic matrix composite (CMC) skin and an outer skin radially spaced from the inner CMC skin with respect to a center axis of the gas turbine engine, each inner CMC skin defining a part of an inner surface of the combustor chamber; and
an annular CMC interface formed about the center axis and disposed between the dome and duct portions, the interface extending from a first side at a first axial end of the interface to a second side at a second axial end of the interface and having an inner circumferential face providing a portion of the inner surface of the combustor chamber, the first and second sides each having an inner annular joint groove extending axially from each of the first and second axial ends into the interface toward the other of the first and second axial ends, each inner joint groove receiving a respective one of the inner CMC skins to form a continuous CMC surface with the inner circumferential face, and an outer annular joint groove extending axially from each of the first and second axial ends into the interface toward the other of the first and second axial ends, each outer joint groove receiving a respective one of the outer skins, each outer joint groove being radially outward of each inner joint groove.

* * * * *